US012689966B2

(12) United States Patent
Sanders et al.

(10) Patent No.: US 12,689,966 B2
(45) Date of Patent: Jul. 21, 2026

(54) REPEATER CREATION FOR BATTERY POWERED AND LOW POWER DEVICES

(71) Applicant: ABL IP HOLDING LLC, Atlanta, GA (US)

(72) Inventors: Alan David Sanders, Atlanta, GA (US); Ryan A. Zaveruha, Trumbull, CT (US); Richard L. Westrick, Jr., Social Circle, GA (US)

(73) Assignee: ABL IP HOLDING LLC, Atlanta, GA (US)

( * ) Notice: Subject to any disclaimer, the term of this patent is extended or adjusted under 35 U.S.C. 154(b) by 281 days.

(21) Appl. No.: 18/632,984

(22) Filed: Apr. 11, 2024

(65) Prior Publication Data

US 2024/0373316 A1 Nov. 7, 2024

Related U.S. Application Data

(60) Provisional application No. 63/463,189, filed on May 1, 2023.

(51) Int. Cl.
| | |
|---|---|
| *H04W 40/02* | (2009.01) |
| *H04L 45/247* | (2022.01) |
| *H04L 45/44* | (2022.01) |
| *H05B 47/19* | (2020.01) |

(52) U.S. Cl.
CPC ......... *H04W 40/023* (2013.01); *H04L 45/247* (2022.05); *H04L 45/44* (2013.01); *H05B 47/19* (2020.01)

(58) Field of Classification Search
CPC .... H04W 40/023; H04L 45/247; H04L 45/44; H05B 47/19
See application file for complete search history.

(56) References Cited

U.S. PATENT DOCUMENTS

| | | | | |
|---|---|---|---|---|
| 10,349,306 | B2 * | 7/2019 | Kahtava | H04L 45/22 |
| 11,178,002 | B1 * | 11/2021 | Selvaraj | H04L 41/0668 |
| 2017/0171950 | A1 * | 6/2017 | Barna | H04L 12/2827 |
| 2019/0294833 | A1 * | 9/2019 | Lu | G06K 7/10207 |
| 2021/0282070 | A1 * | 9/2021 | Sanders | H04W 40/248 |
| 2022/0038949 | A1 * | 2/2022 | Petria | H04W 28/04 |
| 2023/0403736 | A1 * | 12/2023 | Bhutani | H04W 74/0808 |

OTHER PUBLICATIONS

Canadian Examination Report issued Apr. 15, 2025, by the Canadian Intellectual Property Office in corresponding Canadian Application No. 3,236,571. (4 pages).

* cited by examiner

*Primary Examiner* — Harry H Kim
(74) *Attorney, Agent, or Firm* — Sikand IP Law PLLC

(57) ABSTRACT

A method includes tracking one or more echoes of an original message sent from a battery-powered device in a wireless communication network. The battery-powered device includes a lighting control device or a phenomenon sensor. The method further includes adjusting a likelihood of designating a repeater for the battery-powered device based on the battery-powered device receiving an adjustment echo of the one or more echoes or one or more line-powered devices receiving the original message directly from the battery-powered device. The method further includes determining whether or not to designate a repeater for the battery-powered device based on the battery-powered device receiving a determination echo of the one or more echoes of the original message, or the one or more line-powered devices receiving the original message directly from the battery-powered device.

18 Claims, 5 Drawing Sheets

FIG. 2

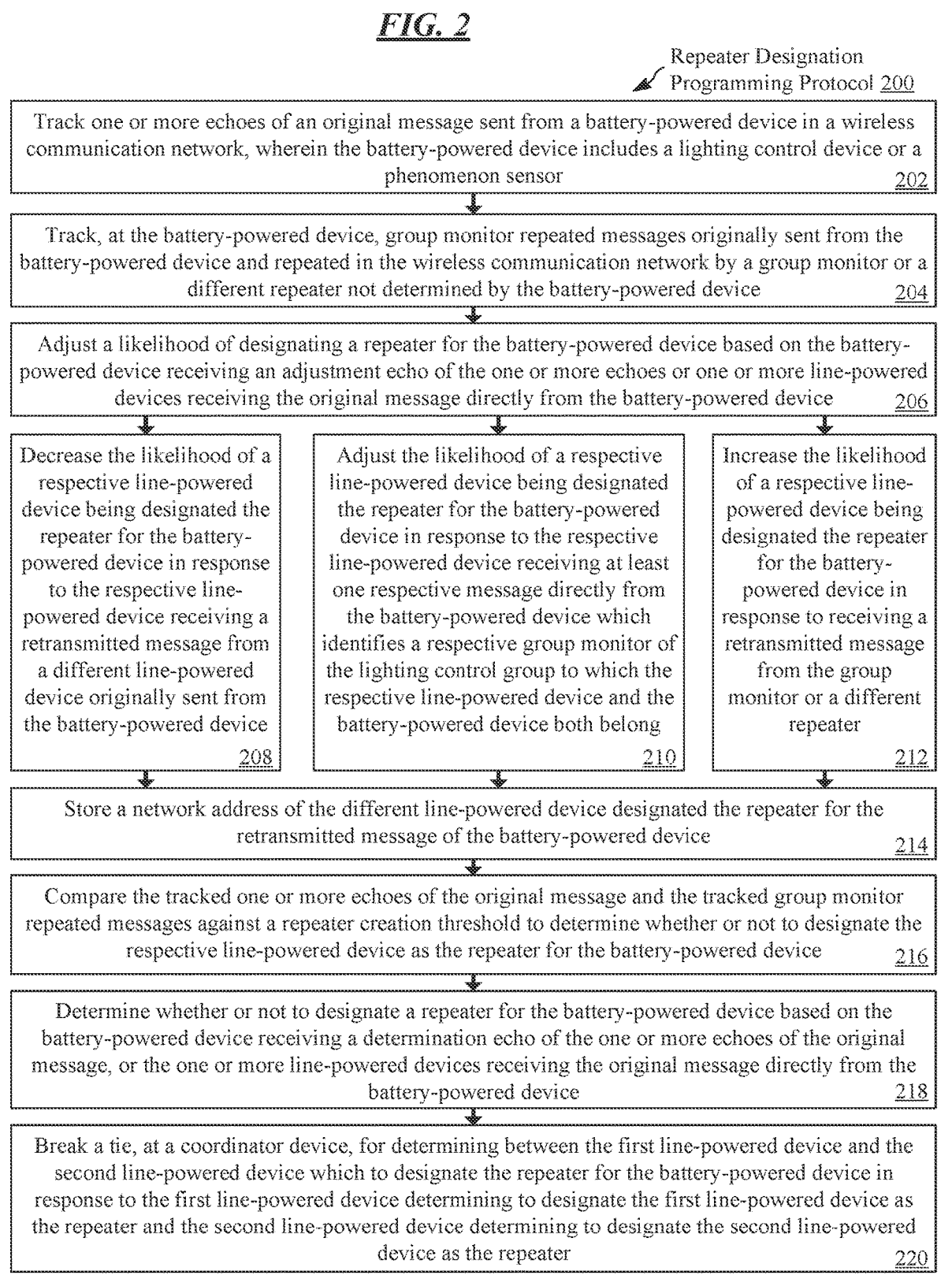

Repeater Designation
Programming Protocol 200

Track one or more echoes of an original message sent from a battery-powered device in a wireless communication network, wherein the battery-powered device includes a lighting control device or a phenomenon sensor     202

Track, at the battery-powered device, group monitor repeated messages originally sent from the battery-powered device and repeated in the wireless communication network by a group monitor or a different repeater not determined by the battery-powered device     204

Adjust a likelihood of designating a repeater for the battery-powered device based on the battery-powered device receiving an adjustment echo of the one or more echoes or one or more line-powered devices receiving the original message directly from the battery-powered device     206

| | | |
|---|---|---|
| Decrease the likelihood of a respective line-powered device being designated the repeater for the battery-powered device in response to the respective line-powered device receiving a retransmitted message from a different line-powered device originally sent from the battery-powered device 208 | Adjust the likelihood of a respective line-powered device being designated the repeater for the battery-powered device in response to the respective line-powered device receiving at least one respective message directly from the battery-powered device which identifies a respective group monitor of the lighting control group to which the respective line-powered device and the battery-powered device both belong 210 | Increase the likelihood of a respective line-powered device being designated the repeater for the battery-powered device in response to receiving a retransmitted message from the group monitor or a different repeater 212 |

Store a network address of the different line-powered device designated the repeater for the retransmitted message of the battery-powered device     214

Compare the tracked one or more echoes of the original message and the tracked group monitor repeated messages against a repeater creation threshold to determine whether or not to designate the respective line-powered device as the repeater for the battery-powered device     216

Determine whether or not to designate a repeater for the battery-powered device based on the battery-powered device receiving a determination echo of the one or more echoes of the original message, or the one or more line-powered devices receiving the original message directly from the battery-powered device     218

Break a tie, at a coordinator device, for determining between the first line-powered device and the second line-powered device which to designate the repeater for the battery-powered device in response to the first line-powered device determining to designate the first line-powered device as the repeater and the second line-powered device determining to designate the second line-powered device as the repeater     220

FIG. 4

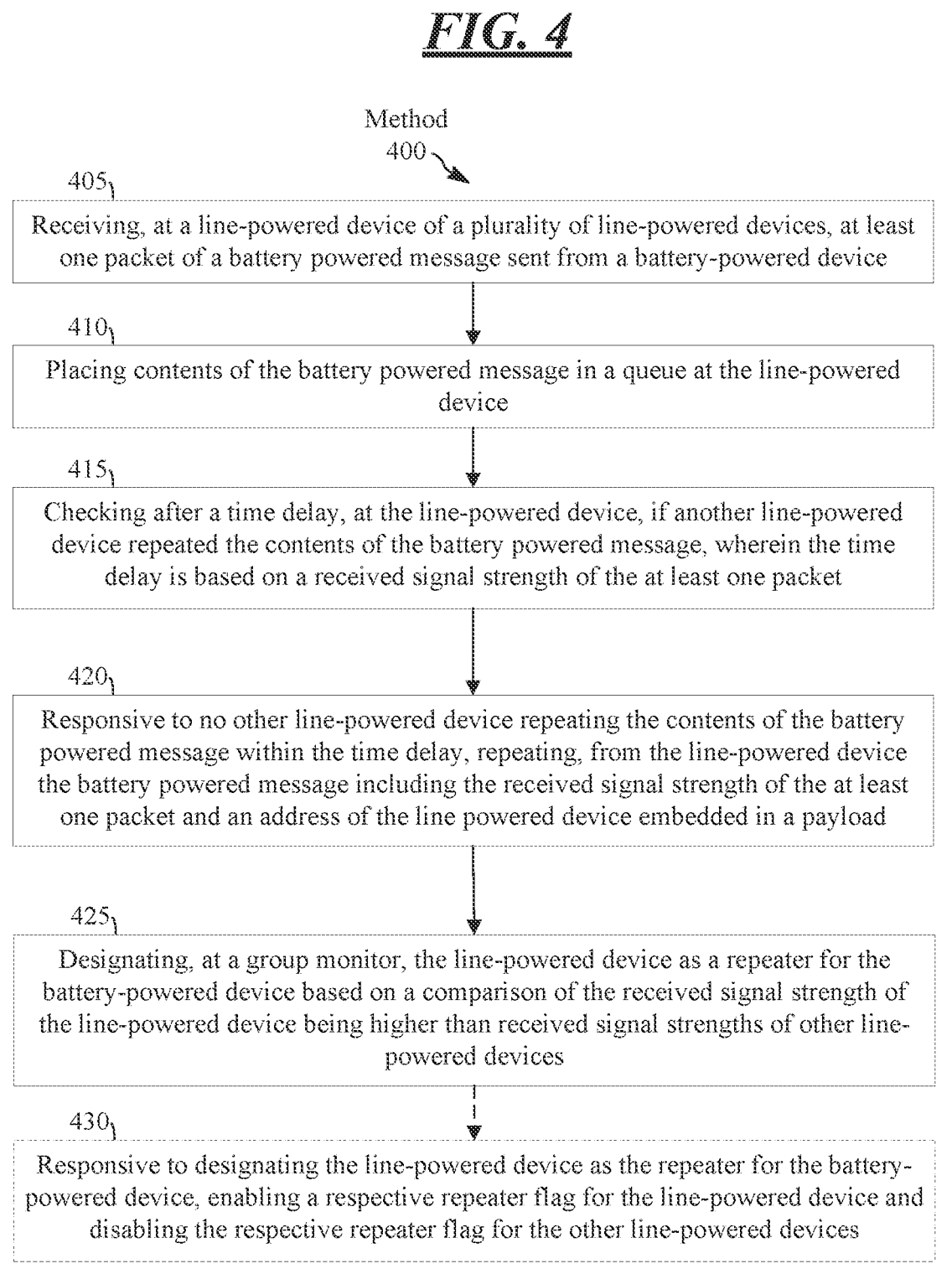

Method
400

405

Receiving, at a line-powered device of a plurality of line-powered devices, at least one packet of a battery powered message sent from a battery-powered device

410

Placing contents of the battery powered message in a queue at the line-powered device

415

Checking after a time delay, at the line-powered device, if another line-powered device repeated the contents of the battery powered message, wherein the time delay is based on a received signal strength of the at least one packet

420

Responsive to no other line-powered device repeating the contents of the battery powered message within the time delay, repeating, from the line-powered device the battery powered message including the received signal strength of the at least one packet and an address of the line powered device embedded in a payload

425

Designating, at a group monitor, the line-powered device as a repeater for the battery-powered device based on a comparison of the received signal strength of the line-powered device being higher than received signal strengths of other line-powered devices

430

Responsive to designating the line-powered device as the repeater for the battery-powered device, enabling a respective repeater flag for the line-powered device and disabling the respective repeater flag for the other line-powered devices

REPEATER CREATION FOR BATTERY POWERED AND LOW POWER DEVICES

CROSS-REFERENCE TO RELATED APPLICATIONS

This application claims priority to U.S. Provisional Patent Application No. 63/463,189, filed on May 1, 2023, titled "Repeater Creation for Battery Powered and Low Power Devices," the entire disclosure of which is incorporated by reference herein.

BACKGROUND

Lighting networks controlled by digital signals transmit a range of signals between a variety of network nodes or lighting system elements (LSEs). The lighting networks can be configured as flood mesh networks, where every network node which receives a given message, re-broadcasts that message in an attempt to ensure that any intended recipients ultimately receive the message.

However, in large distributed flood mesh networks, a strategy of indiscriminately forwarding all messages can lead to broadcast storms, where high numbers of network packets are transmitted and re-transmitted in a short period of time. A distributed flood mesh network with no preventative strategies to avoid broadcast storms can experience messages being rapidly re-broadcast indefinitely, ultimately stifling all effective communication and essentially bringing the communication within the network offline.

Some flood mesh networks solve this problem by directing only certain network nodes to re-broadcast messages. Those certain network nodes, often called repeaters, can include a list or map of network nodes which directly or indirectly depend upon a given repeater to receive messages sent throughout the network.

However, battery-powered and low-power devices create issues for lighting networks, repeaters, and the repeater designation process. Battery-powered devices are often control devices, allowing an operator of the control device to dictate behavior of the luminaires among the LSEs. The control devices can also be networked sensors, which allow an operator to indirectly dictate luminaire behavior. In some circumstances, it is more energy and cost-effective for these control devices to be battery-powered. The power consumption is relatively low compared to the luminaires, making line-powered control devices relatively expensive for the benefit provided. Additionally, in environments where the luminaires are being upgraded from a non-networked or an outdated networked setting, the luminaires often can be installed where the prior luminaires once were, utilizing the previously-installed power output. The control devices, however, may not replace existing control devices or light switches, and therefore installing new power output to the new control devices can become cost-prohibitive.

If these battery-powered and low-power devices are located nearby the network gateway, or a group monitor responsible for a related group of luminaires, then direct communication between the battery-powered and low-power devices and the network gateway or group monitor is possible. However, in many circumstances, the battery-powered and low-power devices are mounted near the edge of the area lit by a group of luminaires, and consequently may be far from pertinent networked devices. Additionally, to preserve energy, the battery-powered and low-power devices often broadcast at a lower power level, with a consequently smaller broadcast radius, further reducing their ability to directly communicate with pertinent networked devices. These battery-powered and low-power devices, if treated like line-powered network devices, will often receive sub-standard or insufficient network communication capability.

An improved networking protocol implementing message repeating strategies and topologies directed to facilitating battery-powered and low-power device messaging within a flood mesh-based lighting system is needed to overcome these and other limitations in the art.

SUMMARY

Techniques are described herein relating to a repeater designation programming protocol of the lighting system elements of a lighting system. The repeater designation programming protocol described herein can identify repeater network nodes to facilitate battery-powered and low-power devices communications within a flood mesh lighting system network in order to efficiently route network control messages throughout the lighting system network.

In a first example, a method includes tracking one or more echoes 170C-D of an original message 170A sent from a battery-powered device 4A in a wireless communication network 25. The battery-powered device 4A includes a lighting control device 146 or a phenomenon sensor 156. The method further includes adjusting a likelihood of designating a repeater 5A for the battery-powered device 4A based on the battery-powered device 4A receiving an adjustment echo 170C of the one or more echoes 170C-D or one or more line-powered devices 4F receiving the original message 170A directly from the battery-powered device 4A. The method further includes determining whether or not to designate a repeater 5A for the battery-powered device 4A based on the battery-powered device 4A receiving a determination echo 170C of the one or more echoes 170C-D of the original message 170A, or the one or more line-powered devices 4F receiving the original message 170A directly from the battery-powered device 4A.

In a second example, a method includes tracking a respective echo success count 160A of messages sent from each of a plurality of battery-powered devices 4A-B in a wireless communication network 25. The battery-powered devices 4A-B include a light switch or an occupancy, audio, or daylight sensor. The method further includes adjusting the respective echo success count 160A to increase a likelihood of a line-powered device 4F being designated a repeater 5A for a respective battery-powered device 4A of the plurality of battery-powered devices 4A-B in response to the line-powered device 4F receiving at least one message 170A directly from the respective battery-powered device 4A which identifies a group monitor identifier 172 of a lighting control group 8A to which the line-powered device 4F and the respective battery-powered device 4A both belong. The method further includes adjusting the respective echo success count 160A to decrease the likelihood of the line-powered device 4F being designated the repeater 5A for the respective battery-powered device 4A in response to the line-powered device 4F receiving a retransmitted message 170B from another line-powered device 4G originally sent from the respective battery-powered device 4A. The method further includes comparing the respective echo success count 160A against a repeater creation threshold 161 to determine whether or not to designate the line-powered device 4F as a repeater 5A for the respective battery-powered device 4A.

In a third example, a battery-powered device 4A includes a lighting control device 146 or a phenomenon sensor 156. The battery-powered device 4A is configured to track one or more echoes 170C-D of an original message 170A sent from the battery-powered device 4A in a wireless communication network 25. The battery-powered device 4A is further configured to adjust a likelihood of designating a repeater 5A for the battery-powered device 4A based on the battery-powered device 4A receiving an adjustment echo 170C-D of the one or more echoes 170C-D or one or more line-powered devices 4F receiving the original message 170A directly from the battery-powered device 4A. The battery-powered device 4A is further configured to determine whether or not to designate a repeater 5A for the battery-powered device 4A based on the battery-powered device 4A receiving a determination echo 170C-D of the one or more echoes 170C-D of the original message 170A, or the one or more line-powered devices 4F receiving the original message 170A directly from the battery-powered device 4A.

In a fourth example, a line-powered device 4F of one or more line-powered devices 4C-H is configured to track one or more echoes 170C-D of an original message 170A sent from a battery-powered device 4A in a wireless communication network 25. The battery-powered device 4A includes a lighting control device 146 or a phenomenon sensor 156. The line-powered device 4F is further configured to adjust a likelihood of designating a repeater 5A for the battery-powered device 4A based on the battery-powered device 4A receiving an adjustment echo 170C-D of the one or more echoes 170C-D or the one or more line-powered devices 4F receiving the original message 170A directly from the battery-powered device 4A. The line-powered device 4F is further configured to determine whether or not to designate a repeater 5A for the battery-powered device 4A based on the battery-powered device 4A receiving a determination echo 170C-D of the one or more echoes 170C-D of the original message 170A, or the one or more line-powered devices 4F receiving the original message 170A directly from the battery-powered device 4A.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a repeater designation programming protocol for the lighting system that is implemented by the gateway and lighting system elements.

FIG. 4 is a flowchart of a method that can be implemented as another repeater designation programming protocol for designating at least one repeater in the lighting system.

PARTS LISTING

Figure 1A:
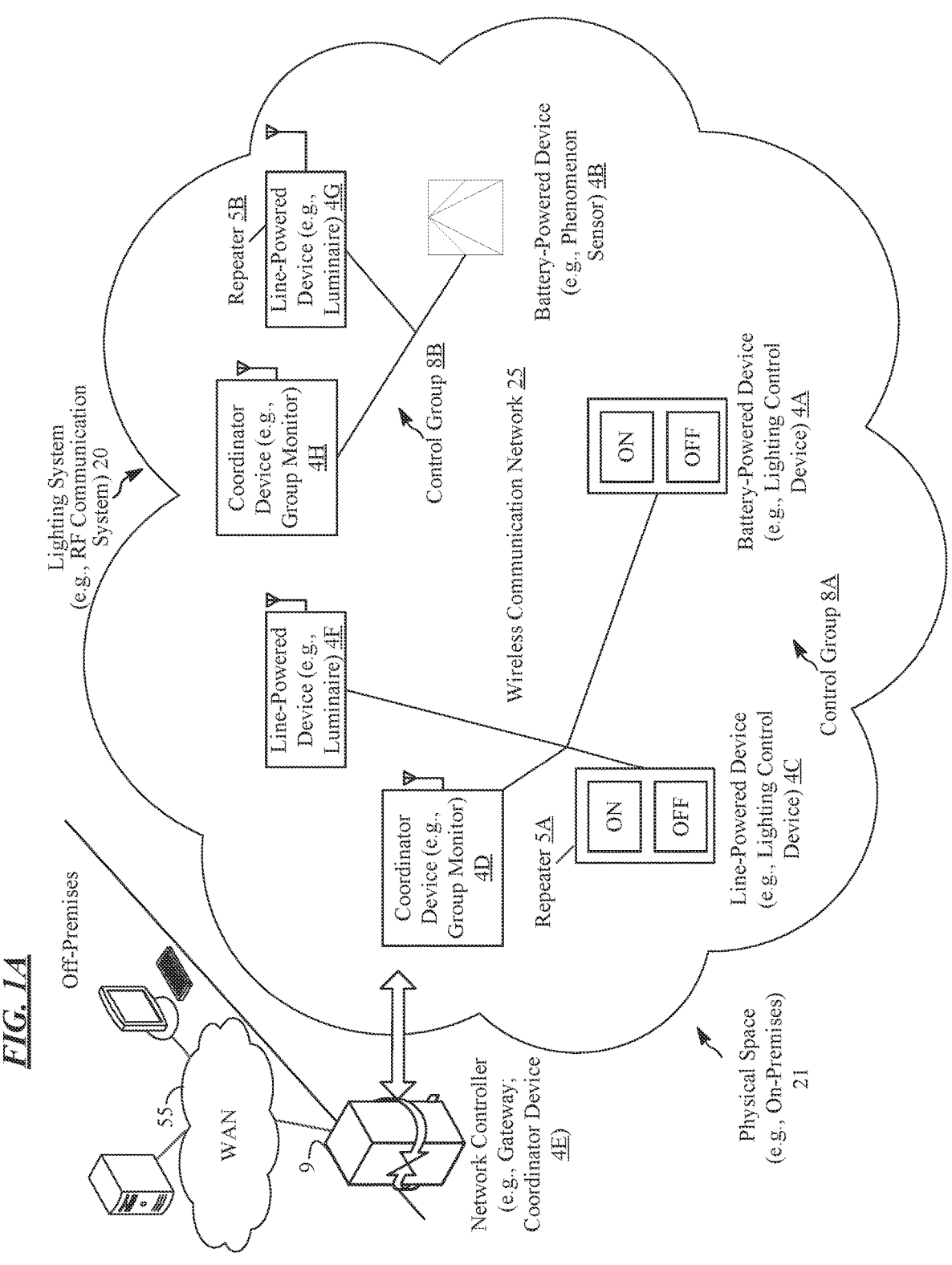
FIG. 1A depicts a lighting system with a gateway and a plurality (e.g., seven) lighting system elements organized into lighting control groups made up of battery-powered devices, line-powered devices, and group monitors, connected via a wireless communication network.

4A-H Lighting System Elements
4A-B Battery-Powered Device

4C-H Line-Powered Device
4D,H Coordinator Device (e.g., Group Monitor)
5A-C Repeater
8A-B Lighting Control Group
9 Network Controller (e.g., Gateway)
20 Lighting System (e.g., RF Communication System)
21 Physical Space (e.g., On-Premises)
25 Wireless Communication Network
55 WAN
130 Memory
131 Processor
132 Network Communication Interface
133 Driver Circuit
134 Illumination Light Source
135 Repeater Designation Programming
136A-H Repeater Designation Instance
146 Switches or Touch Screen Display
155 Drive/Sense Circuitry
156 Detectors e.g., Phenomenon Sensor
160A-B Echo Success Count
161 Repeater Creation Threshold
162C-G Network Address
163A-B Group Monitor Echo Success Count
170A Message
170B Retransmitted Message
171 Message Contents
172 Group Monitor Identifier
190 Line Power Source
191 Battery Power Source
200 Repeater Designation Programming Protocol
304A-D Lighting System Elements (LSEs)
304A Battery-Powered Device (BPD)
304B-C Line-Powered Device (LPD)
304D Coordinator Device (e.g., Group Monitor (GM))
314A BPD Broadcast Radius
314B-C LPD Broadcast Radius
314D GM Broadcast Radius
305 Repeater
320 Lighting System
400 Method

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

Reference now is made in detail to the examples illustrated in the accompanying drawings and discussed below.

Figure 1B:
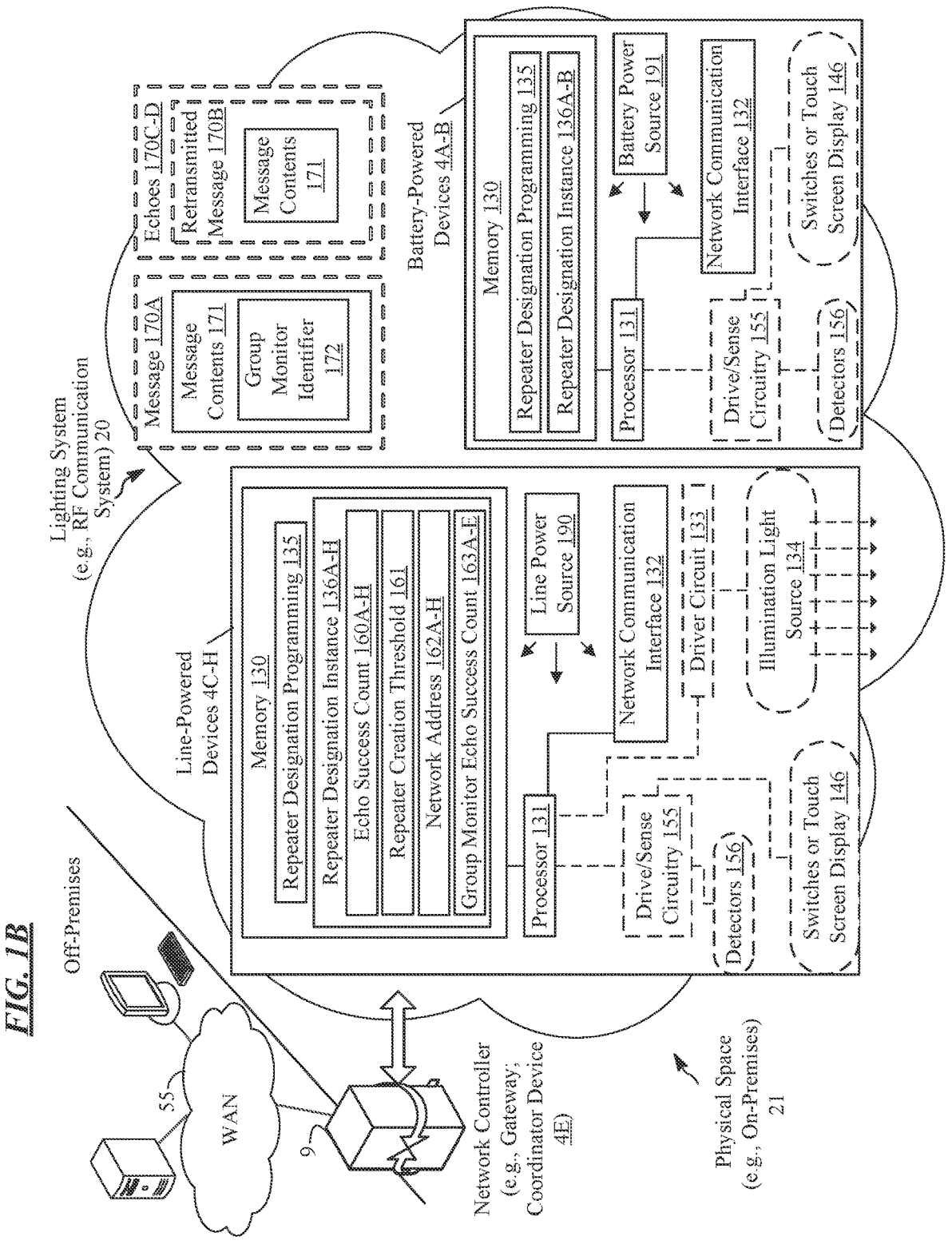
FIG. 1B depicts the lighting system of FIG. 1A, organized into categories of lighting system elements and showing detailed hardware and software elements of the lighting system elements.

FIG. 1A depicts a lighting system 20 with a gateway 9 and a plurality (e.g., seven) lighting system elements 4A-D,F-H organized into lighting control groups 8A-B connected via a wireless communication network 25. FIG. 1B depicts the lighting system of FIG. 1A, organized into categories of lighting system elements 4A-H and showing detailed hardware and software elements of the lighting system elements 4A-H. Lighting system 20 can be a type of radio frequency (RF) communication system. The lighting system 20 can implement a flood mesh network designed to route network control messages 170A for the gateway 9 or network-wide messages over a subset of lighting system elements 4A-H in the flood mesh in order to distribute such messages while avoiding unduly repetitious broadcasts. Lighting system 20 is further designed to route messages 170A for communicating within particular lighting control groups 8A-B within the respective lighting control group 8A to which a given message 170A relates. The gateway 9 can be coupled to a wide area network (WAN) 55.

A control group 8A is a functional grouping of lighting system elements 4A,C,D,F. In some examples, a control group 8A-B will include controlled devices, i.e., luminaires 4F-G or a plug load controller, which provides lighting or electricity respectively. A control group 8A-B can also include controlling devices, i.e., lighting control devices 4A,C and phenomenon sensor 4B, which provide instructions to associated controlled devices regarding how to provide lighting or electricity, or how to operate generally. Often, a control group 8A can constitute a lighting group, such as the ceiling lights in a given room, to be controlled in a collective manner. In other examples, however, the control group 8A may be grouped based on usage principles, e.g., all lights in all stairwells of the physical space 21, or all plug load controllers in a high flood-risk area.

Lighting system elements 4A-H of the lighting system 20 are located in a physical space 21, such as a building. In the example, lighting system elements 4F-G are luminaires; lighting system elements 4A,C are lighting control devices; lighting system element 4B is an occupancy, daylight, or audio sensor, referred to generally as a phenomenon sensor; lighting system elements 4D,H are coordinator devices e.g., group monitors. The gateway 9 can also function as a coordinator device 4E. Luminaires 4F-G illuminate the physical space 21 or premises 21 to a level useful for a human in or passing through the physical space 21, e.g. general illumination of the physical space 21, such as a warehouse, room, or a corridor in a building; or of an outdoor space such as a street, sidewalk, parking lot or performance venue. Lighting control devices 4A,C can be wall switches or touch screen devices to turn on/off or dim luminaires 4F-G. Phenomenon sensor 4B can enable controls for on/off, occupancy, and dimming of the luminaires 4F-G. Coordinator devices 4D,E,H, also called group monitors, are responsible for the management and coordination of control groups 8A-B, as well as some or all of the wireless communication network 25.

Though only a single phenomenon sensor 4B is depicted in FIG. 1A, the lighting system 20 can include any number of phenomenon sensors, in a multiplicity of formats or structures, such as occupancy, daylight, or audio sensors. Likewise, though multiple luminaires 4F-G and lighting control devices 4A,C are depicted, the lighting system 20 can include any number of luminaires 4F-G or lighting control devices 4A,C, in a multiplicity of formats or structures.

Referring to FIGS. 1A-B, as shown, luminaires 4F-G include an illumination light source 134 to emit illumination lighting for the physical space 21; and an optional driver circuit 133 coupled to the illumination light source 134 to control operation of the illumination light source 134. In some examples, the luminaires 4F-G may include a ballast instead of the driver circuit 133 depending on the type of illumination light source 134 (e.g., for a fluorescent or incandescent light bulb).

Luminaires 4F-G, as well as lighting control devices 4A,C and phenomenon sensor 4B (the lighting system elements 4A-H) further include a network communication interface 132 configured for wireless or wired communication, for example, over the network 25. The lighting system elements 4A-H further include a memory 130; and a processor 131 coupled to the network communication interface 132 and the memory 130. The lighting system elements 4A-H further include repeater designation programming 135, designed to implement the repeater designation programming protocol 200 (see FIG. 2). Each lighting system element 4A-H can also instantiate a repeater designation instance 136A-H, which includes a number of memory objects 160-163 in the respective memory 130 of the respective lighting system element 4A-H. The values stored within the memory objects 160-163 in a respective repeater designation instance 136A may differ from the values stored within the memory objects 160-163 in a different repeater designation instance 136B. However, some memory objects 160-163 may be set at a lighting system 20 level, resulting in identical values throughout the repeater designation instances 136A-H.

The repeater designation instances 136A-H include an echo success count 136A-H for as many as each lighting system element 4A-H capable of being designated a repeater. The echo success count 136A-H tracks the number of echoes 170B-C sent from a given battery-powered device 4A. In particular, a particular repeater 5A or potential repeater receiving a direct message 170A from the given battery-powered device 4A will cause the echo success count 136A to increment. An echo 170C-D is a message broadcasted by a lighting system element 4A-H which contains the same message content 171 as a message 170A previously sent by another lighting system element 4A-H. The echo 170C-D may contain additional information beyond the message content 171 from the message 170A. The message 170A may be a broadcast message 170A, which is broadcast to surrounding lighting system elements 4A-H, or a direct message 170A, which is a message sent directly to a particular lighting system element 4A-H. A direct message 170A is not an echo 170C-D, or a retransmitted message 170B which has been previously repeated or rebroadcast by another repeater 5B or group monitor 4D. The echo success count 136A-H is decremented when an echo 170B-C of the direct message 170A is received. The echo 170B-C is being sent by another repeater 5B, and therefore some other lighting system element 4B-H is repeating on behalf of the battery-powered device 4A, resulting in less need for the lighting system element 4C to designate as a repeater 5A.

To determine whether to designate as a repeater 5A, the echo success count 160A is compared to a repeater creation threshold 161. Once an echo success count 160A exceeds the repeater creation threshold, the lighting system 20 has determined that at least the battery-powered device 4A needs a repeater. However, if one lighting system element 4C has an echo success count 160A beyond the repeater creation threshold 161, then it is likely that other lighting system elements 4F,G also have an echo success count 160A beyond the repeater creation threshold 161. In such circumstances, there are several possible options for resolution. First, the group monitor 4D related to the battery-powered device 4A can perform a tie-breaking action and select a line powered device 4C,F,H to act as a repeater 5A for the battery-powered device 4A. The group monitor 4D can implement any known selection algorithm, but in one example the group monitor 4D can prefer line-powered devices 4C,F within the control group 8A for which the group monitor 4D is responsible, and can prefer line-powered devices 4C already designated as a repeater 5A, rather than designate additional repeaters. Too many repeaters unduly increase network traffic and can cause broadcast storms, so minimizing the number of repeaters is often desirable. However, some redundancy, such as having two repeaters for each battery-powered device 4A, can be desirable to improve redundancy and overall connection stability.

A second method for determining whether a given line-powered device 4C should fully designate as a repeater 5A is as follows. First, the repeater 5A determines whether it is a repeater, either provisionally or fully. The provisional repeater state is entered when any echo success count 160A-H within the memory 130 of the line-powered device 4C exceeds the repeater creation threshold 161. The full repeater state is entered when the line-powered device 4C remains a repeater 5A after a full round of this second method of determination. If the line-powered device 4C is provisionally a repeater 5A, the message 170A to be echoed as the retransmitted message 170B is assigned a relatively long delay, and sent after the expiration of that delay.

However, if before sending the retransmitted message 170B, another echo 170C-D of the original message 170A is received, the line-powered device 4C ascertains that some other repeater 5B is repeating on behalf of the battery-powered device 4A, then the line-powered device 4C can return to an undesignated repeater state. If the line-powered device 4C is able to send the retransmitted message 170B before any other lighting system element 4A-H sends the retransmitted message 170B, then the line powered device 4C leaves the provisional repeater state and becomes a full repeater.

Once a full repeater, upon receiving an original message 170A, the repeater 5A waits a relatively short delay, which is a delay shorter than any relatively long delay, and sends the retransmitted message 170B after the relatively short delay. However, if before sending the retransmitted message 170B, another echo 170C-D of the original message 170A is received, then the repeater 5A simply does not send the retransmitted message 1780B. Some other repeater 5B has propagated the original message 170A as an echo 170C-D, and the repeater 5A does not need to unnecessarily increase network traffic to repeat the original message 170A a second time.

In some implementations, further logic exists to change a repeater 5A into a non-repeater state. For example, if the repeater 5A does not receive any original messages 170A for an extended period of time; if the repeater 5A power cycles or disconnects from the wireless communication network 25; or, if the group monitor 4D directs the repeater 5A to stop repeating. The latter logic is useful in a scenario where the battery-powered device 4A can broadcast to both repeater 5A and repeater 5B, but repeater 5A cannot reach repeater 5B or vice versa. Both repeaters 5A-B would be retransmitting the original message 170A as a retransmitted message 170B, but would not see the echo 170C-D from the repeater 5A with the shorter delay, thereby sending the retransmitted message 170B twice.

To facilitate the tracking of echo success counts 160A-H, the network address 162A-H of lighting system elements 4A-H can be tracked. In particular, tracking the network address 162C,G of the repeaters 5A-B can allow other repeaters 5A-B to determine whether a retransmitted message 170B is being transmitted by a repeater 5A-B, or a group monitor 4D,H, or another coordinator device 4E like the gateway 9. Along with these, a group monitor echo success count 163A-E can track other repeaters 5A-B or group monitor 4D,H, or another coordinator device 4E like the gateway 9. The group monitor echo success count 163A-E tracks how often a retransmitted message 170B is received by a given lighting system element 4A-H, and is compared to the echo success count 160A-H for a given originator battery-powered device 4A. If a retransmitted message 170B is received, but the original message 170A is not received, that fact can indicate that the repeater 5A sending the retransmitted message 170B itself requires a repeater 5B to allow the message contents 171 of the original message 170A to reach the intended target lighting system element 4A-H.

The original message 170A is the message broadcast originally sent by the battery-powered device 4A. The original message 170A may be unicast if the battery-powered device 4A has knowledge that the intended recipient is either in direct range, or a designated repeater 5A is within direct range. However, if the battery-powered device 4A is unsure of both of these scenarios, then the original message 170A can be multicast, and either the intended recipient can multicast an acknowledgement, indicating no repeater 5A-B is required for this original message 170A, or one or more repeaters 5A-B can send the message contents 171 of the original message 170A in a retransmitted message 170B. The message contents 171 include the information for receipt by the intended recipient, and may include instructions, or logistical or analytical data as examples, for the operation of the control group 8A-B or the lighting system 20. Echoes 170C-D are multicast retransmitted messages 170B. The retransmitted messages 170B can be unicast if the original message 170A was unicast, and a responsive unicast acknowledgement message is sent to the original message 170A sender.

As shown in FIG. 1B, a phenomenon sensor 4B can include an on-board micro-control unit (MCU) that includes a memory 130 (volatile and non-volatile) and a central processing unit (CPU) 131. The phenomenon sensor 4B has the processor 131 coupled to drive/sense circuitry 155 operable to control detectors 156 and a network communication interface 132. The memory 130 of the phenomenon sensor 4B stores the repeater designation programming 135 and a repeater designation instance 136B.

The circuitry, hardware, and software of the lighting control devices 4A,C shown are similar to the occupancy, daylight, or audio, sensor 4B (e.g. phenomenon sensor). Lighting control devices 4A,C can be a wall switch where the drive/sense circuitry 155 responds to switches 146. Switches 146 can be an on/off switch, dimmer switch, or set scene. Switches 146 can be a single shared button switch for on/off, dimming, or set scene functions. A button station can include various button settings that can have the lighting control settings adjusted, for example, four buttons can be arranged with two longitudinal buttons (north-south) and two lateral buttons (east-west). Alternatively, lighting control devices 4A,C can be a touchscreen device in which lighting control setting adjustments are inputted via a user interface application (not shown) through manipulation or gestures on a touch screen display 146. As shown, the memory 130 of the lighting control devices 4A,C stores the repeater designation programming 135 and a repeater designation instance 136A,C.

The battery-powered devices 4A-B include a battery power source 191 to provide energy to the components 130-132, 146, 155, 156 of the battery-powered devices 4A-B. The battery power source 191 can also be understood to include any power source which generates relatively low power, or intermittent power, such as power generated by kinetic movement of a switch 146 or solar power. The-line powered devices 4C-H include a line power source 190 to provide energy to the components 130-133, 146, 155, 156, which can be understood to include any power source that is designed to provide consistent electrical power, for example electricity provided by an interconnected electrical grid. Any of the roles (e.g., control device, luminaire, group monitor, gateway, phenomenon sensor) can be implemented within a line-powered device or a battery-powered device. The only distinction is the hardware included to perform a role task (e.g. an illumination light source 134 to implement a luminaire) and the power source (e.g., line power sources 190 vs battery power source 191).

FIG. 2 is a repeater designation programming protocol 200 for the lighting system 20 that is implemented by the gateway 9 and lighting system elements 4A-H. The repeater designation programming protocol 200 enables the lighting network 20 to designate repeaters 5A-B from the line-powered devices 4C-H to enable the battery-powered devices 4A-B to reach the remainder of the lighting system 20. Any part of the repeater designation programming protocol 200, and therefore the repeater designation programming 135 can be implemented in any lighting system element 4A-H, unless otherwise indicated.

In the example of FIG. 2, blocks 208, 210, and 212 can execute simultaneously and independently from one another. Some blocks are optional to the flow, though skipping certain blocks can prevent other blocks from being reached. Skipping block 204 prevents the protocol 200 from reaching blocks 208, 212, or 216, as they rely upon tracking group monitor repeated messages. Block 220 can be reached if the protocol 200 is simultaneously traversed by or on behalf of two or more line-powered devices 4C-H up to block 218.

The repeater designation programming protocol 200 is implemented in the repeater designation programming 135 of the lighting system elements 4A-H. Execution of the repeater designation programming 135 stored in a memory 130 by a processor 131 of a given lighting system element 4A causes the given lighting system element 4A to implement blocks 202-220 described below.

Beginning in block 202, the repeater designation programming protocol 200 includes tracking one or more echoes 170C-D of an original message 170A sent from a battery-powered device 4A in a wireless communication network 25. The battery-powered device 4A includes a lighting control device 146 or a phenomenon sensor 156.

Next, in block 204, the repeater designation programming protocol 200 includes optionally tracking, at the battery-powered device 4A or another device 4B-H, group monitor 4D,H repeated messages 170C-D originally sent from the battery-powered device 4A and repeated in the wireless communication network 25 by a group monitor 4D,H or a different repeater 5B not determined by the battery-powered device 4A.

In block 206, the repeater designation programming protocol 200 includes adjusting a likelihood of designating a repeater 5A for the battery-powered device 4A based on the battery-powered device 4A receiving an adjustment echo 170B-C of the one or more echoes 170B-C or one or more line-powered devices 4C receiving the original message 170A directly from the battery-powered device 4A.

There are at least three possible sub-steps to adjust the likelihood of designating a repeater 5A for the battery-powered device 4A. In block 208, the repeater designation programming protocol 200 includes decreasing the likelihood of a respective line-powered device 4C being designated the repeater 5A for the battery-powered device 4A in response to the respective line-powered device 4C receiving a retransmitted message 170B from a different line-powered device 4G originally sent from the battery-powered device 4A.

In block 210, the repeater designation programming protocol 200 includes adjusting the likelihood of a respective line-powered device 4C being designated the repeater 5A for the battery-powered device 4A in response to the respective line-powered device 4C receiving at least one respective message 170A directly from the battery-powered device 4A which identifies (e.g., contains a group monitor identifier 172) of a respective group monitor 4D of the lighting control group 8A to which the respective line-powered device 4C and the battery-powered device 4A both belong.

In block 212, the repeater designation programming protocol 200 includes increasing the likelihood of a respective line-powered device 4C being designated the repeater 5A for the battery-powered device 4A in response to receiving a retransmitted message 170B from the group monitor 4D or a different repeater 5B.

Next, in block 214, the repeater designation programming protocol 200 can include storing a network address 162G of the different line-powered device 4G designated the repeater 5B for the retransmitted message 170B of the battery-powered device 4A.

In block 216, the repeater designation programming protocol 200 can include comparing the tracked one or more echoes 170B-C of the original message 170A and the tracked group monitor repeated messages, tracked as a group monitor echo success count 163A against a repeater creation threshold 161 to determine whether or not to designate the respective line-powered device 4C as the repeater for the battery-powered device 4A, if the group monitor repeated messages are tracked.

Continuing in block 218, the repeater designation programming protocol 200 includes determining whether or not to designate a repeater 5A for the battery-powered device 4A based on the battery-powered device 4A receiving a determination echo 170B-C of the one or more echoes 170B-C of the original message 170A, or the one or more line-powered devices 4C receiving the original message 170A directly from the battery-powered device 4A.

Next, in block 220, the repeater designation programming protocol 200 can include breaking a tie, at a coordinator device 4D, for determining between the first line-powered device 4C and the second line-powered device 4G which to designate the repeater 5A-B for the battery-powered device 4A in response to the first line-powered device 4C determining to designate the first line-powered device 4C as the repeater 5A and the second line-powered device 4G determining to designate the second line-powered device 4G as the repeater 5B.

Figures 3A, 3B:
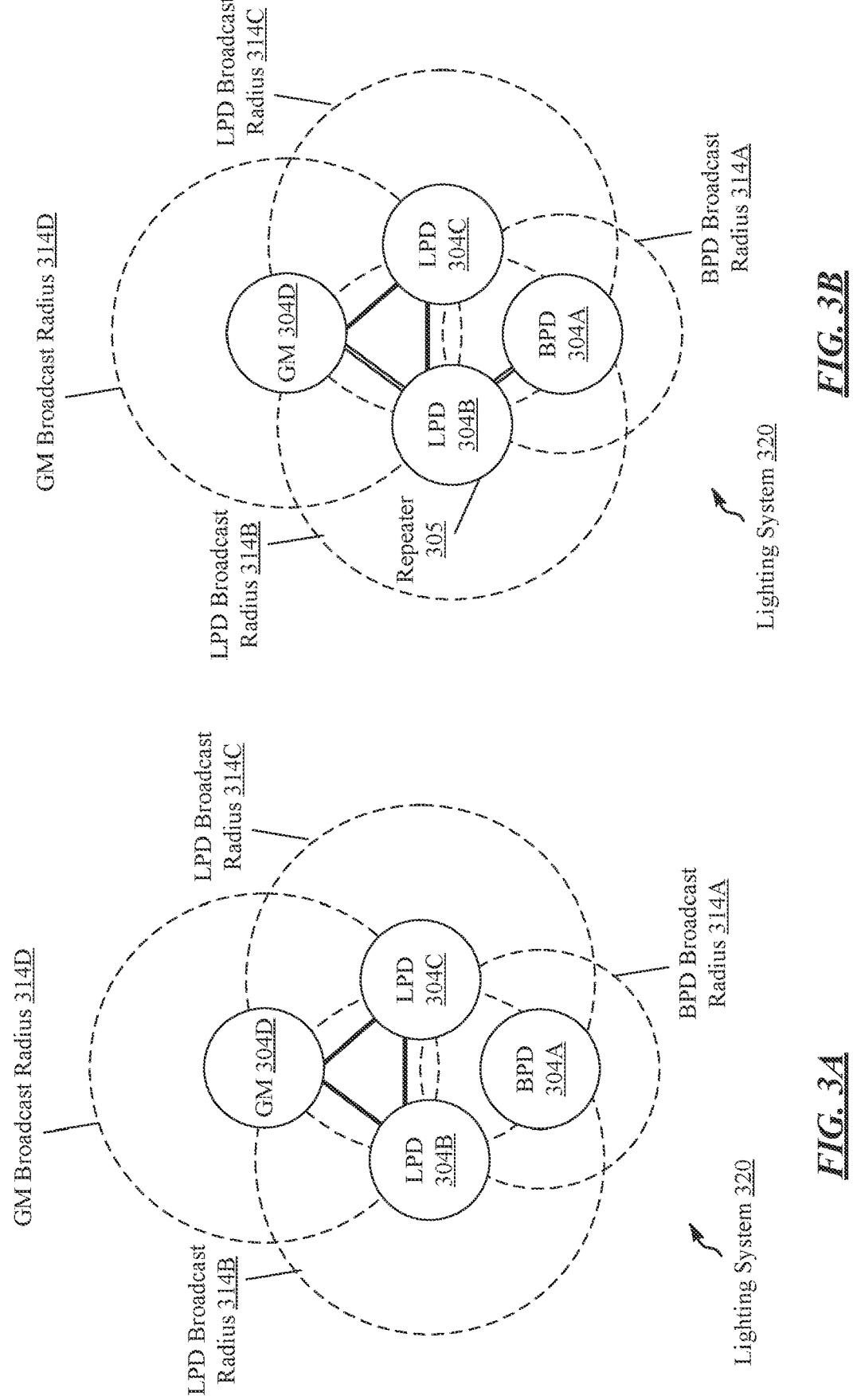
FIGS. 3A-B are depictions of the network topology as a battery-powered device (BPD) seeks to connect to a group monitor (GM) via a line-powered device (LPD).

FIGS. 3A-B are depictions of the network topology as a battery-powered device (BPD) 304A seeks to connect to a group monitor (GM) 304D via a line-powered device (LPD) 304B-C. The primary goal in this example is to connect all of the BPDs 304A to the GM 304D, in some examples in as few hops as possible. The broadcast radii 314A-D depict how far a given lighting system element (LSE) 314A-D is able to send a message 170A-D. Any LSE 304A-D within a given radii 314A-D can receive a unicast messages sent by the associated LSE 304A-D of a given radii 314A-D to that recipient LSE 304A-D, and every LSE 304A-D within that given radii 314A-D receives a multicast message sent by the associated LSE 304A-D of a given radii 314A-D. Given the smaller radius 314A of the BPD 304A, it is possible for the BPD 304A to be able to receive messages from a sender, such as GM 304D, but not be able to effectively acknowledge or reply to those messages from GM 304D.

In FIG. 3A, GM 304D has a GM broadcast radius 314D encompassing the LPDs 304B-C. LPDs 304B-C can receive messages 170A-D from GM 304D. Likewise, the LPD broadcast radii 314B-C encompass the other LPDs 304B-C, as well as GM 304D and the BPD 304A. GM 304D, LPDs 304B-C, and BPD 204A can receive messages 170A-D from LPDs 304B-C. BPD 304A has a smaller BPD broadcast radius 314A, which encompasses LPDs 304B-C, but not GM 304D. Therefore, BPD 304A will require a repeater 5A-B to communicate with GM 304D. The lighting system 320 executes the repeater designation protocol 200. The BPD 304A determines it is not receiving an acknowledgement message or retransmitted message 170B from the GM 304D in response to sending a unicast original message 170A. Therefore, the BPD 304A retransmits the original message 170A as a multicast message. The LPDs 304B-C both receive the multicast original message 170A, and determine that the GM 304D does not send an acknowledging multicast retransmitted message 170B, indicating the GM 304D did not receive the original message 170A. Therefore, both LPDs 304B-C start a random long delay timer. The random long delay timer expires for LPD 304B first, and so LPD 304B echoes 170C-D the original message 170A as a retransmitted message 170B. The GM 304D acknowledges the retransmitted message 170B with a multicast acknowledgement. LPD 304C receives the retransmitted message 170B from LPD 304B and awaits the acknowledgement from GM 304D. If GM 304D does not acknowledge, LPD 304C would need to be a repeater 5A for both BPD 304A and LPD 304B. However, GM 304D does acknowledge, and so LPD 304C does not echo 170C-D the original message 170A from BPD 304A, as LPD 304B has already done so successfully. As shown in FIG. 3B, LPD 304B is then set as a repeater 305.

Within this example, the future messages 170A from BPD 304A will either be unicast toward LPD 304B, which is set as a repeater 305, for forwarding to GM 304D, or will be multicast. If messages 170A are multicast, LPD 304B will have a random short delay, while LPD 304C will have a random long delay for sending a retransmitted messaged 170B. As the random short delay is always shorter than the random long delay, LPD 304B will send the retransmitted message 170B as a multicast message first if working properly, causing LPD 304C to receive the retransmitted message 170B, as well as the multicast acknowledgement from GM 304D, causing LPD 304C to not send the retransmitted message 170B. However, if LPD 304B has network connectivity issues and cannot receive or transmit, LPD 304C will wait the random long delay, and then send the retransmitted message 170B to the GM 304D, and will ultimately be set as the repeater 305.

FIG. 4 is a flowchart of a method 400 that can be implemented as another repeater designation programming protocol 200 for designating at least one repeater 305 in the lighting system 320. In FIG. 4, the repeater designation programming 135 can implement a subset or all of the steps 405, 410, 415, 420, 425, and 430 of the method 400. Most battery-powered devices 4A-B can eventually obtain a repeater 305 using this algorithm because only one instance of a failure of the first attempt of a battery-powered device 4A to reach the group monitor 4D may be needed. When a battery-powered device 4A is pressed, the battery-powered device 4A can attempt to message the group monitor 4D with a unicast message. The only device in the wireless communication network 25 that will receive this message, if any, is the group monitor 4D. If that message fails, the battery-powered device 4A will make subsequent attempts using broadcast messages, which can be seen by any line-powered devices 4C-H in the lighting control group 8.

Beginning in step 405, the method 400 includes receiving, at a line-powered device 4C of a plurality of line-powered devices 4C-H, at least one packet of a battery powered message 170 sent from a battery-powered device 4A.

Continuing to step 410, the method 400 further includes placing contents 171 of the battery powered message 170 in a queue at the line-powered device 4C. Proceeding to step 415, the method 400 further includes checking after a time delay, at the line-powered device 4C, if another line-powered device 4D-H repeated the contents 171 of the battery powered message 170. The time delay can be based on a received signal strength (e.g., RSSI) of the at least one packet. Packets received at a higher signal strength can have a shorter time delay than packets received at a lower signal strength.

Any line-powered device 4C-H in the group 8 where a group monitor connected flag==True && AllowedRepeater==True, can repeat the broadcast packet it sees from the battery-powered device 4A. This re-transmission can be delayed based on the RSSI of the packet, unless the line-powered device 4C-H actually is the repeater 305, for example, the repeater flag is set to true, i.e. Repeater [rPOD]==True. In that case, the line-powered device 4C-H will repeat with a delay based on its network address 162. In addition to repeating the packet, the line-powered device 4C-H will embed the received signal strength (e.g., RSSI) and its network address 162 into the payload. The group monitor 4D uses this information to choose one of the line-powered devices 4C-H to become a repeater for that battery-powered device 4A.

Moving now to step 420, the method 400 further includes responsive to no other line-powered device 4D-H repeating the contents 171 of the battery powered message 170 within the time delay, repeating, from the line-powered device 4C the battery powered message 170 including the received signal strength of the at least one packet and an address 162C of the line powered device 4C embedded in a payload. Finishing now in step 425, the method 400 further includes designating, at a group monitor 4D, the line-powered device 4C as a repeater 305 for the battery-powered device 4A based on a comparison of the received signal strength of the line-powered device 4C being higher than received signal strengths of other line-powered devices 4D-H.

When the group monitor 4D receives multiple repeats, the group monitor 4D can send out a message setting the best repeater 305. This allows for a change of a repeater 305 and accounts for the possibility that some line-powered devices 4C, E-H miss the response from the group monitor 4D. If a line-powered device 4C-H misses the message letting the line-powered device 4C-H know it is not the chosen repeater 305, the line-powered device 4C-H will repeat the next message from the battery-powered device 4A. The chosen line-powered device 4C-H will also repeat the message from the battery-powered device 4A and the group monitor 4D will decide again which is chosen.

Proceeding to step 430, the method 400 can optionally include responsive to designating the line-powered device 4C as the repeater 305 for the battery-powered device 4A, enabling a respective repeater flag for the line-powered device 4C and disabling the respective repeater flag for the other line-powered devices 4D-H.

Once the group monitor 4D has chosen a repeater 305 for a specific battery-powered device 4A, the other line-powered devices 4D-H will cease repeating the messages of the battery-powered device 4A by setting a repeater flag, such as the flag AllowedRepeater=False. As long as AllowedRepeater==False, a line-powered device 4C-H will not repeat the message of the battery-powered device 4A. This state can change, however, if the line-powered device 4C-H notices that the received signal strength (e.g., RSSI) of the packets from the battery-powered device 4A have changed significantly. For example, if the battery-powered device 4A is moving, each time a message is received from the battery-powered device 4A, the line powered devices 4C-H can compare the RSSI to the previous RSSI (lastRSSI [rPOD]) measured for the battery-powered device 4A. If this number ever increases by a significant amount, e.g. 14 dB or more, then the line-powered device 4C-H resets its AllowedRepeater to True and it will repeat the packet, implying that the battery-powered device 4A has moved positions.

Any of the functionality of the repeater designation programming protocol 200 described herein for the gateway 9, lighting system elements 4A-H, etc. can be embodied in one more applications or firmware as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate functionality described herein.

In the examples above, the gateway 9, lighting system elements 4A-H, etc. each include a processor. As used herein, a processor 131, is a hardware circuit having elements structured and arranged to perform one or more processing functions, typically various data processing functions. Although discrete logic components could be used, the examples utilize components forming a programmable central processing unit (CPU). A processor 131 for example includes or is part of one or more integrated circuit (IC) chips incorporating the electronic elements to perform the functions of the CPU. The processors for example, may be based on any known or available microprocessor architecture, such as a Reduced Instruction Set Computing (RISC) using an ARM architecture. Of course, other processor circuitry may be used to form the CPU or processor hardware in. The illustrated examples of the processors can include one microprocessor or a multi-processor architecture. The processors can include one or more of any known general purpose processor or integrated circuit such as a central processing unit (CPU), microprocessor, field programmable gate array (FPGA), application specific integrated circuit (ASIC), digital signal processor (DSP), or other suitable programmable processing or computing device or circuit as desired that is specially programmed to perform operations for achieving the results of the examples described herein.

The applicable processor 131 executes programming or instructions to configure the gateway 9, lighting system elements 4A-H, etc. to perform various operations. For example, such operations may include various general operations (e.g., a clock function, recording and logging operational status and/or failure information) as well as various system-specific operations (e.g., daylighting and/or energy management) functions. Although a processor 131 may be configured by use of hardwired logic, typical processors in lighting devices or in light responsive devices are general processing circuits configured by execution of programming, e.g., instructions and any associated setting data from the memories 130 shown or from other included storage media and/or received from remote storage media.

In the examples above, the gateway 9, lighting system elements 4A-H, etc. each include a memory. The memory 130 may include a flash memory (non-volatile or persistent storage), a read-only memory (ROM), and a random access memory (RAM) (volatile storage). The RAM serves as short term storage for instructions and data being handled by the processors 131 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Hence, a machine-readable medium or a computer-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In the examples above, the gateway 9, lighting system elements 4A-H, etc. each include a network communication interface 132 for wired or wireless communication over one or more networks 25. The networks 25 interconnect the links to/from the network communication interfaces of the devices, so as to provide data communications amongst the gateway 9, and/or lighting system elements 4A-H. Networks 25 may support data communication by equipment at the premises via wired (e.g. cable or fiber) media or via wireless (e.g. WiFi, Bluetooth, ZigBee, LiFi, IrDA, etc.) or combinations of wired and wireless technology.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element. Unless otherwise stated, the articles "a" or "an" preceding an element mean one or more of the elements.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method, comprising steps of:
   (a) tracking one or more echoes of an original message sent from a battery-powered device in a wireless communication network, wherein the battery-powered device includes a lighting control device or a phenomenon sensor;
   (b) adjusting a likelihood of designating a repeater for the battery-powered device based on the battery-powered device receiving an adjustment echo of the one or more echoes or one or more line-powered devices receiving the original message directly from the battery-powered device;
   (c) determining whether or not to designate a repeater for the battery-powered device based on the battery-powered device receiving a determination echo of the one or more echoes of the original message, or the one or more line-powered devices receiving the original message directly from the battery-powered device; and
   (d) decreasing the likelihood of a respective line-powered device being designated the repeater for the battery-powered device in response to the respective line-powered device receiving a retransmitted message from a different line-powered device originally sent from the battery-powered device.

2. The method of claim 1, further comprising:

implementing steps (a) through (d) at a first line-powered device and a second line-powered device; and breaking a tie, at a coordinator device, for determining between the first line-powered device and the second line-powered device which to designate the repeater for the battery-powered device in response to the first line-powered device determining to designate the first line-powered device as the repeater and the second line-powered device determining to designate the second line-powered device as the repeater.

3. The method of claim 2, wherein the coordinator device is a group monitor.

4. The method of claim 1, further comprising:

implementing steps (a) through (d) for each of a plurality of battery-powered devices.

5. The method of claim 1, wherein step (a) includes:

tracking a respective one or more echoes of messages sent from a respective battery-powered device for a plurality of battery-powered devices in the wireless communication network.

6. The method of claim 1, wherein:

step (b) includes adjusting a respective likelihood of designating the respective line-powered device of the one or more line-powered devices being designated the repeater for the battery-powered device in response to the respective line-powered device receiving at least one respective message directly from the battery-powered device which identifies a respective group monitor of the lighting control group to which the respective line-powered device and the battery-powered device both belong.

7. The method of claim 1, further comprising:

storing a network address of the different line-powered device designated the repeater for the retransmitted message of the battery-powered device.

8. A method, comprising steps of:

(a) tracking one or more echoes of an original message sent from a battery-powered device in a wireless communication network, wherein the battery-powered device includes a lighting control device or a phenomenon sensor;

(b) adjusting a likelihood of designating a repeater for the battery-powered device based on the battery-powered device receiving an adjustment echo of the one or more echoes or one or more line-powered devices receiving the original message directly from the battery-powered device;

(c) determining whether or not to designate a repeater for the battery-powered device based on the battery-powered device receiving a determination echo of the one or more echoes of the original message, or the one or more line-powered devices receiving the original message directly from the battery-powered device;

(d) tracking, at the battery-powered device, group monitor repeated messages originally sent from the battery-powered device and repeated in the wireless communication network by a group monitor or a different repeater not determined by the battery-powered device; and (e) increasing the likelihood of a respective line-powered device being designated the repeater for the battery-powered device in response to receiving a retransmitted message from the group monitor or the different repeater.

9. The method of claim 8, wherein step (c) further comprises:

comparing the tracked one or more echoes of the original message and the tracked group monitor repeated messages against a repeater creation threshold to determine whether or not to designate the respective line-powered device as the repeater for the battery-powered device.

10. A method, comprising steps of:

(a) tracking a respective echo success count of messages sent from each of a plurality of battery-powered devices in a wireless communication network, wherein the battery-powered devices include a light switch or an occupancy, audio, or daylight sensor;

(b) adjusting the respective echo success count to increase a likelihood of a line-powered device being designated a repeater for a respective battery-powered device of the plurality of battery-powered devices in response to the line-powered device receiving at least one message directly from the respective battery-powered device which identifies a group monitor identifier of a lighting control group to which the line-powered device and the respective battery-powered device both belong;

(c) adjusting the respective echo success count to decrease the likelihood of the line-powered device being designated the repeater for the respective battery-powered device in response to the line-powered device receiving a retransmitted message from another line-powered device originally sent from the respective battery-powered device; and (d) comparing the respective echo success count against a repeater creation threshold to determine whether or not to designate the line-powered device as a repeater for the respective battery-powered device.

11. The method of claim 10, further comprising:

implementing steps (a) through (d) at a first line-powered device and a second-line powered device; and breaking a tie, at a coordinator device, for a role of the repeater for the respective battery-powered device between the first line-powered device and the second line-powered device in response to the first line-powered device determining to designate the first line-powered device as the repeater and the second line-powered device determining to designate the second line-powered device as the repeater.

12. The method of claim 10, wherein:

step (b) includes: adjusting the respective echo success count to increase a respective likelihood of the line-powered device being designated the repeater for the respective battery-powered device in response to the line-powered device receiving at least one respective message directly from the respective battery-powered device which identifies a respective group monitor identifier of the lighting control group to which the line-powered device and the respective battery-powered device both belong.

13. The method of claim 10, further comprising:

storing a network address of the other line-powered device that is the repeater for the retransmitted message of the respective battery-powered device.

14. The method of claim 10, further comprising:

implementing steps (a) through (d) at the respective battery-powered device.

15. The method of claim 10, further comprising:

(e) adjusting a group monitor echo success count to increase the likelihood of the line-powered device being designated the repeater for the respective battery-powered device in response to receiving the retransmitted message from a group monitor or a different repeater not created by the respective battery-powered device.

16. The method of claim 10, wherein step (c) further comprises:

comparing both the respective echo success count and a group monitor echo success count against the repeater creation threshold to determine whether or not to designate the line-powered device as the repeater for the respective battery-powered device.

17. A battery-powered device, comprising a lighting control device or a phenomenon sensor, wherein the battery-powered device is configured to:

track one or more echoes of an original message sent from the battery-powered device in a wireless communication network;

adjust a likelihood of designating a repeater for the battery-powered device based on the battery-powered device receiving an adjustment echo of the one or more echoes or one or more line-powered devices receiving the original message directly from the battery-powered device;

determine whether or not to designate a repeater for the battery-powered device based on the battery-powered device receiving a determination echo of the one or more echoes of the original message, or the one or more line-powered devices receiving the original message directly from the battery-powered device; and decrease the likelihood of a respective line-powered device being designated the repeater for the battery-powered device in response to the respective line-powered device receiving a retransmitted message from a different line-powered device originally sent from the battery-powered device.

18. A line-powered device of one or more line-powered devices, wherein the line-powered device is configured to:

track one or more echoes of an original message sent from a battery-powered device in a wireless communication network, wherein the battery-powered device includes a lighting control device or a phenomenon sensor;

adjust a likelihood of designating a repeater for the battery-powered device based on the battery-powered device receiving an adjustment echo of the one or more echoes or the one or more line-powered devices receiving the original message directly from the battery-powered device;

determine whether or not to designate a repeater for the battery-powered device based on the battery-powered device receiving a determination echo of the one or more echoes of the original message, or the one or more line-powered devices receiving the original message directly from the battery-powered device; and decrease the likelihood of a respective line-powered device being designated the repeater for the battery-powered device in response to the respective line-powered device receiving a retransmitted message from a different line-powered device originally sent from the battery-powered device.

* * * * *